(12) United States Patent
Ebert et al.

(10) Patent No.: US 8,696,414 B2
(45) Date of Patent: Apr. 15, 2014

(54) AUTOMATIC DISPLACER CLEARANCE ADJUSTMENT

(75) Inventors: Detlef Ebert, Bad Nauheim (DE); Michael Hummel, Raunheim (DE)

(73) Assignee: Poly-Clip System GmbH & Co. KG, Hattersheim (DE)

( * ) Notice: Subject to any disclaimer, the term of this patent is extended or adjusted under 35 U.S.C. 154(b) by 478 days.

(21) Appl. No.: 12/967,996

(22) Filed: Dec. 14, 2010

(65) Prior Publication Data

US 2011/0143902 A1 Jun. 16, 2011

(30) Foreign Application Priority Data

Dec. 15, 2009 (EP) .................................... 09015524

(51) Int. Cl.
*A22C 11/00* (2006.01)
*A22C 13/02* (2006.01)

(52) U.S. Cl.
USPC ............................................. 452/21; 452/51

(58) Field of Classification Search
USPC .................... 452/21, 31, 46, 48, 51
See application file for complete search history.

(56) References Cited

U.S. PATENT DOCUMENTS

| | | | | |
|---|---|---|---|---|
| 4,091,505 A | * | 5/1978 | Muller et al. | 452/47 |
| 4,750,239 A | * | 6/1988 | Niedecker | 452/48 |
| 5,087,463 A | * | 2/1992 | Raudys et al. | 426/138 |
| 5,918,447 A | * | 7/1999 | Hanten et al. | 53/551 |
| 6,705,063 B1 | * | 3/2004 | Topfer et al. | 53/577 |
| 7,240,466 B2 | * | 7/2007 | Vermee et al. | 53/417 |
| 7,479,057 B2 | * | 1/2009 | Waldstaedt et al. | 452/32 |

FOREIGN PATENT DOCUMENTS

| | | |
|---|---|---|
| DE | 196 06 654 C1 | 4/1997 |
| DE | 199 34 154 C1 | 10/2000 |
| EP | 0 239 144 A2 | 9/1987 |

OTHER PUBLICATIONS

EP09015524.3-1260 Extended European Search Report dated Jun. 9, 2010, 8 pages.

* cited by examiner

*Primary Examiner* — David Parsley
(74) *Attorney, Agent, or Firm* — Hahn Loeser & Parks LLP

(57) ABSTRACT

An apparatus and method producing a plait-like portion on a tubular packaging casing, which accommodates a filling material includes a plait-like portion at least approximately free of filling material, extending along a longitudinal plait-axis. The apparatus comprises a first displacer unit with a first pair of displacer elements reversibly movable between an opened and a closed position perpendicular to the longitudinal plait-axis. A displacer clearance is created between the first pair of displacer elements, which surrounds the longitudinal plait-axis, in which the tubular packaging casing is being gathered, when the first pair of displacer elements is in the closed position. The apparatus comprises a second displacer unit with a second pair of displacer elements also being reversibly movable between an opened and a closed position perpendicular to the longitudinal plait-axis. A displacer clearance is created between the second pair of displacer elements, similar to first pair of displacer elements.

20 Claims, 5 Drawing Sheets

AUTOMATIC DISPLACER CLEARANCE ADJUSTMENT

CROSS REFERENCE TO RELATED APPLICATIONS

This patent application claims priority to and the benefit of European patent application EP 09 015 524.3-1260, filed Dec. 15, 2009, which is hereby incorporated herein by reference.

BACKGROUND OF THE INVENTION

The present invention relates to an apparatus and a method for producing a plait-like portion on a tubular packaging casing according to the preamble of independent claims 1 and 10.

In particular, the invention concerns an apparatus for producing a plait-like portion on a tubular packaging casing which accommodates a filling material in particular sausage meat, wherein the plait-like portion is at least approximately free of filling material and comprises along a longitudinal plait-axis. The apparatus comprises a first displacer unit with a first pair of displacer elements being reversibly movable perpendicular to the longitudinal plait-axis between an opened and a closed position. A displacer clearance is being created between the first pair of displacer elements, which surrounds the longitudinal plait-axis and in which the tubular packaging casing is being gathered, when the first pair of displacer elements is in the closed position. Beyond that, the apparatus comprises a second displacer unit with a second pair of displacer elements also being reversibly movable perpendicular to the longitudinal plait-axis between an opened and a closed position. Again, a displacer clearance is being created between the second pair of displacer elements, which surrounds the longitudinal plait-axis and in which the tubular packaging casing is being gathered, when the second pair of displacer elements is in the closed position. The second displacer unit is reversibly movable parallel to the longitudinal plait-axis between a narrow position in which the first displacer unit is adjacent to the second displacer unit, and a spread position in which the second displacer unit is moved away from the first displacer unit. Furthermore, the apparatus comprises a first drive unit for the movement of the first and second pair of displacer elements between the opened and closed position. The first drive unit comprises an adjustment device rotatable around a pivot axis essentially parallel to the longitudinal plait-axis.

Moreover, the invention concerns method for producing a plait-like portion on a tubular packaging casing which accommodates a filling material in particular sausage meat, wherein the plait-like portion is at least approximately free of filling material and extends along a longitudinal plait-axis. The method includes the steps of conveying of a filling material into a tubular packaging casing and constricting the filled tubular packaging casing by moving a first pair of displacer elements of a first displacer unit and a second pair of displacer elements of a second displacer unit from an opened into a closed position by means of a first drive unit. Furthermore, a displacer clearance is created between the first and second pair of displacer elements surrounding the longitudinal plait-axis, in which the tubular packaging casing is being gathered when the first and second pair of displacer elements are in the closed position. Thereafter, a plait-like portion is produced by moving the second displacer unit parallel to the longitudinal plait-axis away from a narrow position in which the second displacer unit is adjacent to the first displacer unit, into a spread position in which the second displacer unit is away from the first displacer unit.

It is the usual practice in sausage production, to use for example automatic clipping machines for filling e.g. sausage meat via a filling tube into a flexible packaging material, like a tubular casing which is closed by a closure means, referred to as closing clip, at the first end. After the filling operation is concluded, a gathered plait-like portion, which is free of filling material, is formed by two displacer units. Two more clips are then applied to that plait-like portion, a first closing clip in order to close the second end of the filled packaging material and a second closing clip in order to close the first end of the subsequent sausage product. Thereafter, said plait-like portion is severed between said two clips creating one complete sausage product and packaging material closed at its first end to be filled, in order to form the next sausage product. Such a practice for producing sausages is disclosed, for example, by EP-patent application 1 967 073 A1 or DE-Utility model 20 2006 012 324 U1.

After the filling process, the sausage products can be sometimes subjected to further processing, for example in a smoking chamber or they are just being packed in a box for shipping.

The different sausage products are typically characterized by a number of parameters, such as caliber (i.e. the actual diameter of the sausage product), overall length, specific type of the filling material as well as packaging casing material etc. Also, it is possible to vary the density of the filling material, in order to produce loosely filled or tightly filled sausage products, by injecting more or less filling material into the casing. However, in case of a tightly filled sausage product, these sausage products are rather prone to damages on the casing, due to the high pressure inside the sausage product and the often thin and sensitive casing material. Impacts, falls and other kinds of careless handling can result inevitable in notable damages to the sausage products, which lead to outcast and unnecessary costs. A particular problem in this context constitutes within the actual procedure of constricting the casing by means of the two displacer units and forming the plait-like portion out of the tubular packaging casing. Depending on the above mentioned parameters, in particular, sensitive casing material or "normal" casing material which is filled with sausage meat at high pressure may be damaged during the constricting process when executed at a "normal" speed. Moreover, the casing material may be also damaged during forming the plait-like portion.

SUMMARY OF THE INVENTION

The object of the present invention is to solve the above described problem. In particular, it is the object of the present invention to provide an apparatus according to independent claim 1 and a method according to independent claim 10 for producing a plait-like portion on a tubular packaging casing, with which the risk of damaging the casing material while constricting said material and forming a plait-like portion will be reduced and the productivity in the production of sausage like products is raised.

What is proposed, in particular, is an apparatus for producing a plait-like portion on a tubular packaging casing which accommodates a filling material in particular sausage meat, wherein the plait-like portion is at least approximately free of filling material and comprises a longitudinal plait-axis. The apparatus comprises a first displacer unit with a first pair of displacer elements being reversibly movable perpendicular to the longitudinal plait-axis between an opened and a closed position. A displacer clearance is being created between the first pair of displacer elements, which surrounds the longitudinal plait-axis, in which the tubular packaging casing is being gathered, when the first pair of displacer elements is in the closed position. Beyond that, the apparatus comprises a second displacer unit with a second pair of displacer elements also being reversibly movable perpendicular to the longitudinal plait-axis between an opened and a closed position. Again, a displacer clearance is being created between the second pair of displacer elements, which surrounds the longitudinal plait-axis, in which the tubular packaging casing is being gathered, when the second pair of displacer elements is in the closed position. The second pair of displacer elements is reversibly movable parallel to the longitudinal plait-axis between a narrow position in which the first displacer unit is adjacent to the second displacer unit, and a spread position in which the second displacer unit is moved away from the first displacer unit. Furthermore, the apparatus comprises a first drive unit for the movement of the first and second pair of displacer elements between the opened and closed position. The first drive unit comprises an adjustment device rotatable around a pivot axis essentially parallel to the longitudinal plait-axis.

According to the present invention, it is proposed that the pivot axis of the adjustment device is adjustable for changing the size of the displacer clearance created by the first and second pair of displacer elements. Adapting the size of the displacer clearance depending on the cross-section area of the plait-like portion optimizes the voiding of the filling material from the plait-like portion.

Also, adapting the size of the displacer clearance depending on e.g. the sensitivity of casing material or the caliber of the sausage product to be produced, reduces the risk of damaging while gathering the casing material and forming the plait-like portion.

It is advantageous that the adjustment device comprises a drive element and a two-armed lever which are coupled to each other by a torque transmission element in order to transmit the motion of the drive mechanism via a drive arm to the displacer units. The transmission of the motion from a drive mechanism to the displacer units can alternatively be done by a chain-drive, gear-drive, belt-drive or any other possible means of transmission. The torque transmission element can be in form of a sliding block or likewise, to permit the drive element and the two-armed lever to be shifted relative to each other while allowing a continuously transmission of torque. In order to support this, it is also favorably that the torque transmission element is attached to the two-armed lever and is extending into a radial aligned guide being part of the drive element, to allow the torque transmission element to continuously transmit torque from the drive element to the two-armed lever, even if the two-armed lever varies its position relative to the drive element.

To allow a variation of the position of the two-armed lever relative to the drive element, it is possible that the adjustment device comprises a bushing with an eccentric portion and a centric portion, in order to provide two centers of rotation for the bushing. In this configuration, the two-armed lever is mounted onto the eccentric portion of the bushing, to allow the pivot axis of the two-armed lever to orbit around the pivot axis of the drive element.

In order to facilitate the adjustment of the position of the bushing, in a preferred embodiment the adjustment device comprises a locking ring with an eccentric adapter firmly connected onto the bushing.

A second drive unit can be provided to the apparatus for driving the adjustment device in a rotational motion. The second drive unit may be formed by a linear actuator, in order to convert rotary into linear motion. However, it is also possible that the second drive is in form of other kinds of motors. It is further advantageous, that the second drive unit comprises a lead screw with a lead screw nut, for the purpose of providing a purchase for leading off the motion of the drive unit.

With the aim of transmitting the linear motion of the drive unit onto the adjustment device, the second drive unit advantageously comprises a drive rod connecting the lead screw nut with the locking ring. It is also possible that the second drive unit is transmitting its actuation by other means, such as a gear-, belt-drive or other appropriate gears. Alternatively, the second drive unit can directly be mounted on the adjustment device.

With the purpose of control and adjust their actuation, it is further advantageous that a control unit is linked to the first and second drive units. In this case, the adjustment device may automatically be actuated on the basis of data regarding the sausage products actually to be produced.

It is the further object of the present invention to solve the above described problem by providing a method according to independent claim 12 of the present. In particular, a method is provided for producing a plait-like portion on a tubular packaging casing which accommodates a filling material in particular sausage meat, wherein the plait-like portion is at least approximately free of filling material and comprises along a longitudinal plait-axis. The method comprises the steps of conveying of a filling material into a tubular packaging casing and constricting the filled tubular packaging casing by moving a first pair of displacer elements of a first displacer unit and a second pair of displacer elements of a second displacer unit from an opened into a closed position by means of a first drive unit. Furthermore, a displacer clearance is created between the first and second pair of displacer elements surrounding the longitudinal plait-axis, in which the tubular packaging casing is being gathered when the first and second pair of displacer elements are in the closed position, and a plait-like portion is produced by moving the second displacer unit parallel to the longitudinal plait-axis away from a narrow position in which the second displacer unit is adjacent to the first displacer unit, into a spread position in which the second displacer unit is away from the first displacer unit.

In accordance with the present invention, the method further comprises the step of changing the size of the displacer clearance created by the first and second pair of displacer elements by adjusting a pivot axis of an adjustment device. By changing the size of the displacer clearance, the risk of damaging in particular sensitive casing material may be reduced. Moreover, an adaption may be made to the caliber of the sausage-like product to be produced e.g., in case of a larger caliber of the sausage product, to the additional casing material forming a plait-like portion of a respectively larger diameter.

The method further comprises the step of putting parameter of a pre-selected product, which is to be produced, into a control unit controlling the adjustment device, from which in a preferred embodiment a signal corresponding to the parameter of the pre-selected product is transmitted from the control unit to the second drive unit driving the adjustment device. Thereafter, in accordance with the signal transmitted to the second drive unit corresponding to the parameter of the pre-selected product, a bushing of the adjustment device is positioned.

The above mentioned features of the inventive method allow an automatically adjustment of the adjustment device on the basis of data regarding pre-selected products. The adjustment of the size of the displacer clearance by means of the adjustment device may even be done during on-going production without having to stop the sausage-product manufacturing process. Thereby, the sausage production may be improved and increased. In particular, the voiding of the filling material from the plait-like portion will be optimized. Moreover, the risk of damaging the casing material will be minimized while maintaining a constant or higher production rate.

Other advantages and one embodiment of the present invention shall now be described with reference to the attached drawings. The term "top", "bottom", "left" and "right" used when describing the embodiment relate to the drawings orientated in such a way that the reference numerals and name of the figures can be read normally.

DETAILED DESCRIPTION OF THE INVENTION

The embodiment of the inventive apparatus described in the following is used within clipping machines for the production of sausage products. The inventive apparatus may also be used, of course, in production of sausage-shaped products that are not foodstuffs, but for example, sealing compounds or adhesives.

Figure 1:
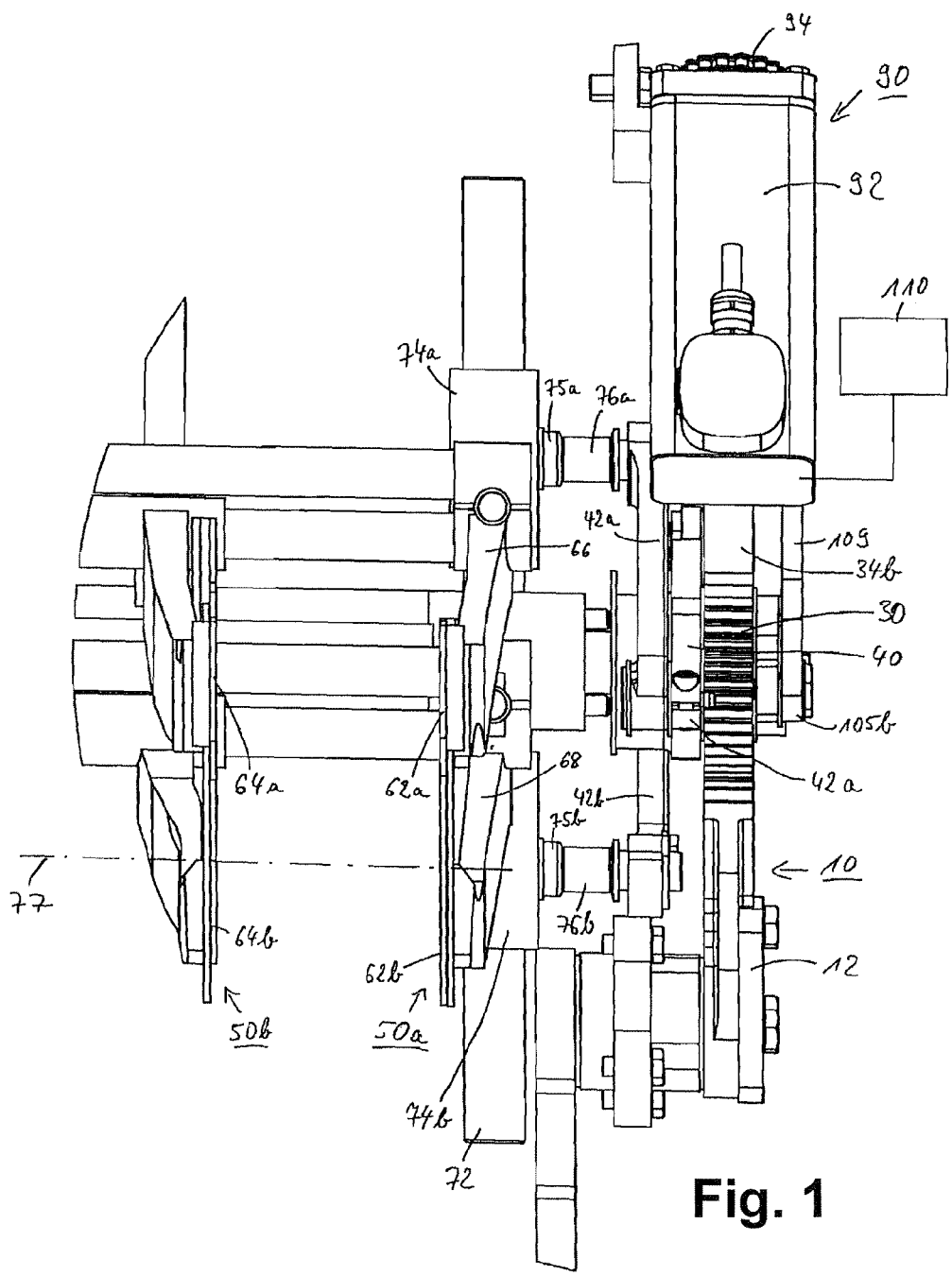
FIG. 1 shows a front view of the inventive apparatus.

FIG. 1 shows a schematic front view of the inventive apparatus according to a preferred embodiment in perspective direction perpendicular to a longitudinal plait-axis 77, together with first and second drive units 10, 90, a first displacer unit 50a having a first pair of displacer elements 60a and a second displacer unit 50b having a second pair of displacer elements 60b. The first and second displacer units 50a, 50b are actuated by the first drive unit 10 for a reversible movement perpendicular to the plait-axis 77 along vertical displacer guide rods. FIG. 1 shows only the first displacer guide rod 72 along which the first pair of displacer elements 60a is vertically slidable. The apparatus according to the present invention comprises an adjustment device 20 as well as a second drive unit 90 actuating the adjustment device 20.

Figure 2:
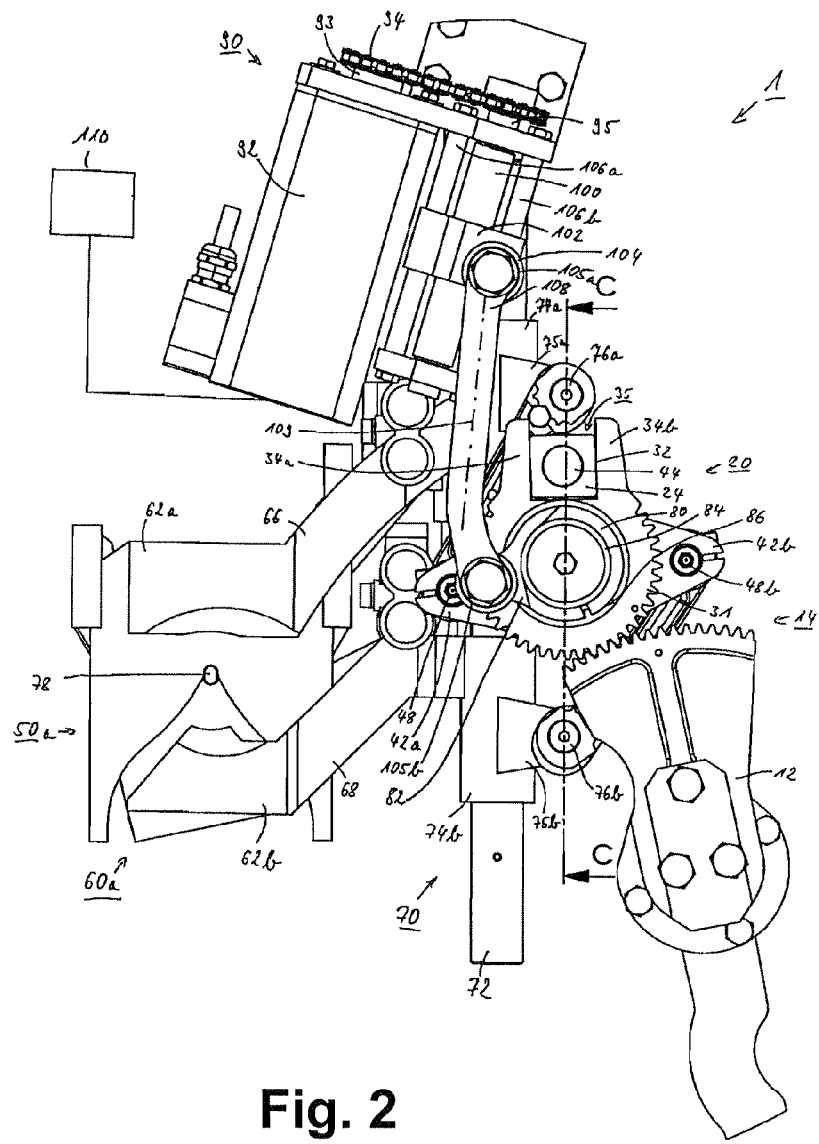
FIG. 2 shows a side view of the inventive apparatus according to FIG. 1.

FIG. 2 shows a schematic side view of the inventive apparatus according to a preferred embodiment in perspective direction of the longitudinal plait-axis 77, together with first and second drive units 10, 90 and first and second displacer units 50a, 50b actuated by the first drive unit 10.

FIG. 2 shows a first displacer unit 50a together with upper and lower displacer elements 62a, 62b. The upper and lower displacer elements 62a, 62b are connected by upper and lower displacer element supporters 66, 68 onto upper and lower displacer guide sleeves 74a, 74b, which are slidable along the displacer guide rod 72.

In FIG. 2, the upper and lower displacer elements 62a, 62b are in the closed position. That means, the upper displacer element 62a is in its lowest position, whereas the lower displacer element 62b is in its upper most position. In the closed position, the upper and lower displacer elements 62a, 62b form a displacer clearance 78.

The upper displacer guide sleeve 74a can be slided from its current position as shown in FIG. 2, further upwards, in order to move the upper displacer element 62a into the opened position, whereas the lower displacer guide sleeve 74b can be slided from its current position further downwards, in order to move the upper displacer elements 62b into the opened position. The first displacer unit 50a is in the opened position, when the upper displacer element 62a of the first displacer unit 50a is in a maximum linear displacement to the lower displacer element 64a.

FIG. 1 and FIG. 2 further show the first drive unit 10 comprises a drive arm 12 in form of a longitudinal lever 16 with a gear wheel section 15 at its end pointing towards the adjustment device 20. The other end of the lever 16 (not shown) is mounted onto a drive (not shown) of the first drive unit 10 for pivotal driving the drive arm 12.

The adjustment device 20 comprises a drive element 30, a two-armed lever 40, a bushing 25, a torque transmission element 24 and a locking ring 80.

Figure 3:
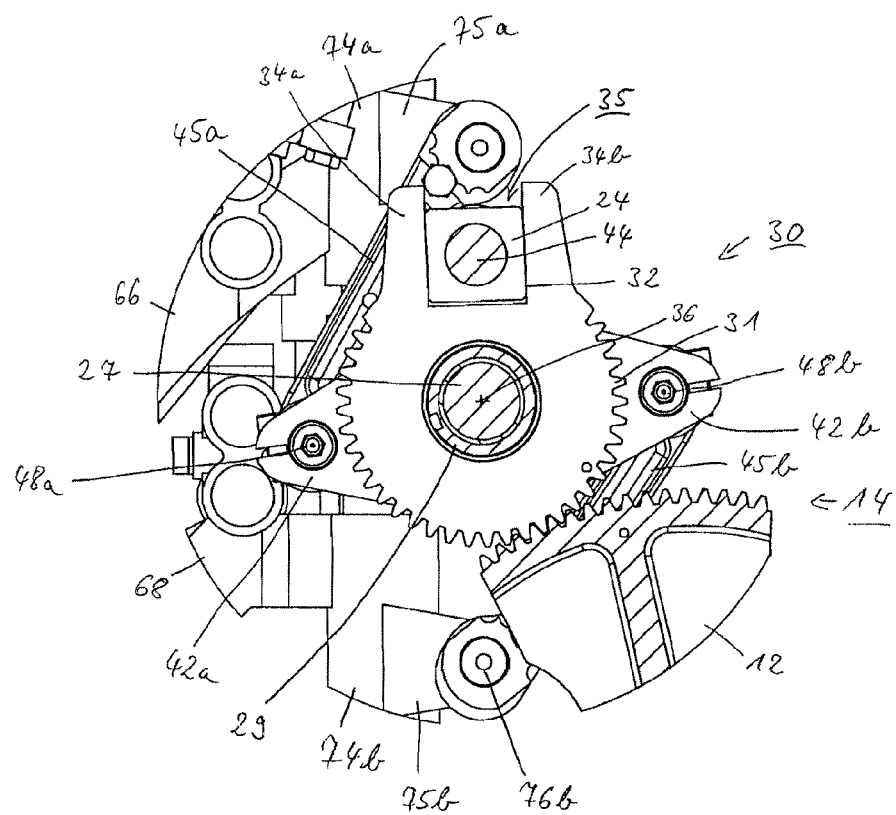
FIG. 3 shows a detailed view of the inventive adjustment device with a drive element in front of a two-armed lever coupled by a torque transmission element.

The drive element 30 is in form of a flat circular disc with a gear wheel section 31 located on its outer edge and two drive element guide arms in form of a left-hand and right-hand longitudinal bars 34a, 34b defining a radial aligned notch 35 between them, as illustrated more particularly in FIG. 3.

Figure 4:
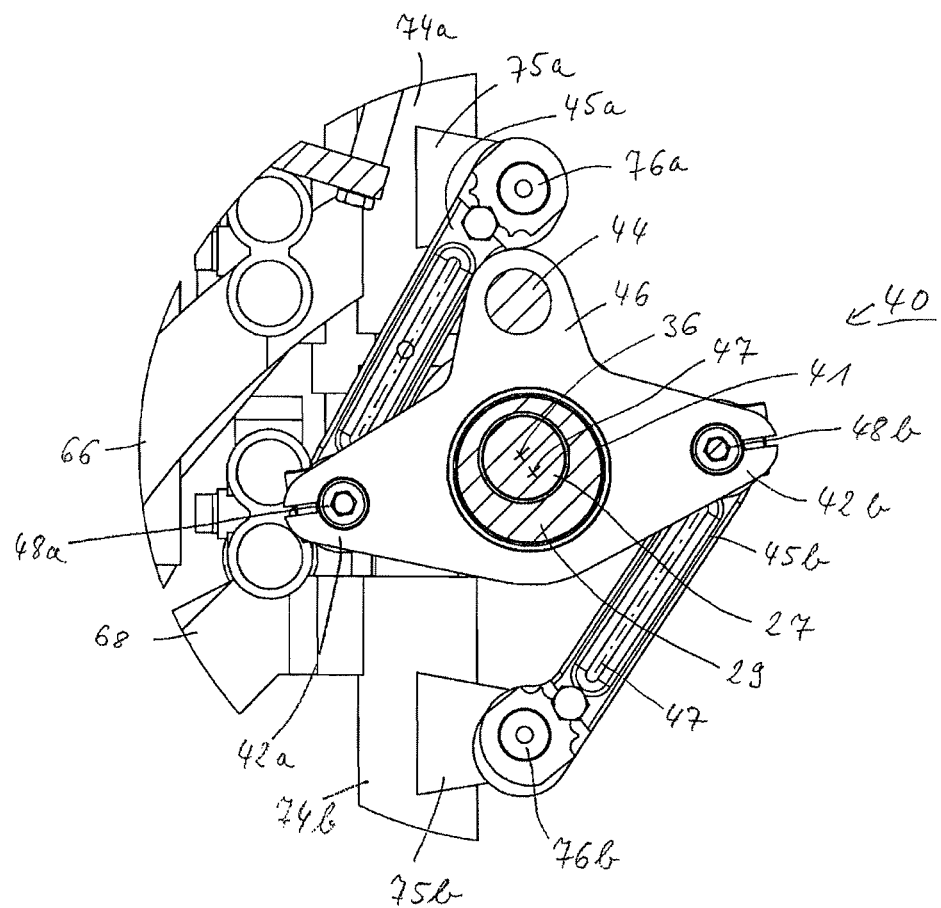
FIG. 4 shows a detailed view on a two-armed lever together with upper and lower connecting rods.

As it can be inferred from FIG. 4, the two-armed lever 40 comprises a flat longitudinal panel 43 with a round centre hole 41, a two-armed lever attachment 46 formed by an eccentric belly, and two adapters 42a, 42b in form of arms. A bolt 44 in form of a cylindrical shaft orientated parallel to the longitudinal plait axis 77 is firmly fitted with one end to the two-armed lever attachment 46. The two adapters 42a, 42b are symmetrical to a plane running through the centre of the two-armed lever 40 parallel to the plait-axis 77, and fitted with holes extending parallel the plait-axis 77 at each ends. The two adapters 42a, 42b are connected by pins 48a, 48b to first ends of longitudinal connecting rods 45a, 45b, which are positioned with their middle centre line 47 perpendicular to the plait axis 77 (see also FIGS. 3 and 5). The second ends of the longitudinal connecting rods 45a, 45b are connected via upper and lower guide sleeve adapter pins 76a, 76b to the displacer guide sleeves 74a, 74b. The displacer guide sleeves 74a, 74b are slidably fitted around displacer guide rods 72, arranged perpendicularly to the plait-axis 77 in a vertical orientation, in order to slide up and down the displacer guide rods 72.

The torque transmission element 24 is formed by a sliding block with a square cross-section fitted between the left-hand and right-hand longitudinal bars 34a, 34b within the notch 35 of the drive element 30. The sliding block 24 comprises a centre hole through which the two-armed lever bolt 44 is fitted (see also FIG. 3 and FIG. 5).

Drive element 30 and two-armed lever 40 are positioned on a drive unit shaft 22. Drive unit shaft 22 thereby extends through centre holes 37, 41 of drive element 30 and two-armed lever 40. Drive unit shaft 22 is firmly coupled with its right-hand side end, as shown in FIG. 5, to displacer guide rod 72, in a horizontal orientation, parallel to plait axis 77.

Drive arm 12 of the first drive unit 10 is connected to the adjustment device 20 by its gear wheel section 15 engaging the gear wheel section 31 of the drive element 30, in order to transmit the torque created by the first drive unit 10 to the drive element 30.

The torque of drive element 30, received by the drive arm 12, is transmitted onto the two-armed lever 40 by the torque transmission element 24.

Figure 5:
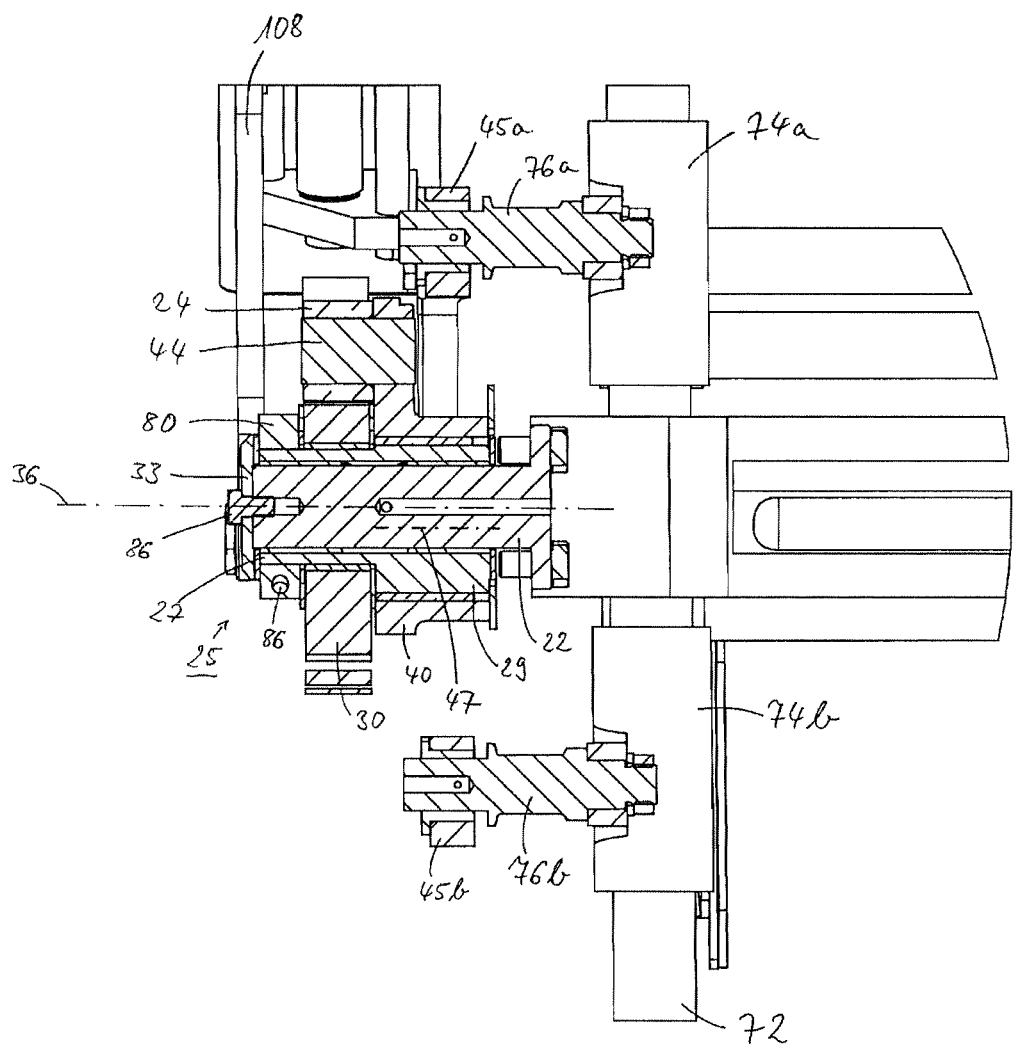
FIG. 5 shows a section view according to section C-C of FIG. 1.

As illustrated in FIG. 5, the drive element 30 is arranged in front of the two-armed lever 40 that means to the left-hand side of the two-armed lever 40. As it can be further inferred from FIG. 5, a bushing 25 is positioned onto the drive unit shaft 22 having an inner diameter corresponding to the outer diameter of drive unit shaft 22. The bushing 25 extends through the centre hole 37 of drive element 30 and the centre hole 41 of the two-armed lever 40. Bushing 25 comprises a centric portion 27 and an eccentric portion 29, which are both formed as cylinders and positioned in their longitudinal direction offset to each other. The drive element 30 is fitted onto the centric portion 27 of the bushing 25 and the two-armed lever 40 is positioned onto the eccentric portion 29 of the bushing 25. The centric portion 27 has a pivot axis 36 and the eccentric portion has a pivot axis 47. Due to the off-centre alignment of the centric portion 27 and the eccentric portion 29, the pivot axis 36 is not identical to the pivot axis 47. A bearing is positioned between the centric portion 27 and the drive element 30 to reduce friction between bushing 25 and drive element 30 during pivotal movement of drive element 30 about the centric portion 27 of bushing 25. The centre line of the centric portion 27 as well as the centre line of the eccentric portion 29 are both parallel to the plait axis 77.

The locking ring 80 is firmly attached around the front end of centric portion 27 of the bushing subjecting from drive element 30. A locking ring cover disc 81 is attached to the left-hand side end of the drive unit shaft 22 by means of a locking ring screw 86, covering the front end of the centric portion 27 of the bushing 25 (see FIGS. 1 and 5).

FIG. 2 shows the second drive unit 90 comprises a motor 92, a longitudinal lead screw 100 and a drive rod 108.

The motor 92, according to the present embodiment, is in form of an electric motor, which is attached to a frame element (not shown) and which comprises a drive shaft (also not shown). A gear drive 93 is connected to the upper end of the drive shaft of the motor 92.

The lead screw 100 comprises a lead screw gear 95 at its upper end pointing away from the adjustment device 20. The centre line 101 of the lead screw 100 extends perpendicular to the plait axis 77 and parallel to the drive shaft of the motor 92. A lead screw nut 102 having with a round lead screw nut adapter 104 is fitted onto the lead screw 100. A roller chain 94 is connecting the gear drive 93 with the lead screw gear 95.

Left-hand and right-hand lead screw guide rods 106a, 106b are arranged parallel to lead screw 100, one on the left-hand side and one on the right-hand side of the lead screw 100, as it can be inferred from FIG. 2. Lead screw nut 102, which is driven along the lead screw 100, comprises extensions on its left- and right-hand sides forming sleeves 103 for engaging left-hand and right-hand lead screw guide rods 106a, 106b.

Drive rod 108 comprises a longitudinal drive rod shaft 107 with circular upper and lower drive rod adapters 105a, 105b. Drive rod 108 is orientated with its centre line 109 perpendicular to the plait axis 77. The upper drive rod adapter 105a is pivotal connected to the lead screw nut adapter 104 and the lower drive rod adapter 105b is pivotal connected to the locking ring adapter 82 of locking ring 80.

The present inventive apparatus also comprises a control unit 110 (schematically shown in FIG. 2). The control unit 110 is connected to the first drive unit 10 and second drive unit 90, in order to feed information into them and to control the actuation of the drive units 10, 90. It is also possible that one control unit is connected to the first drive unit 10 and a separate control unit is connected to the second drive unit 90, and that these two control units are being linked to each other to cross function.

When the drive arm 12 is being put into a pivotal motion by the first drive unit 10, the drive arm 12 is moved reversibly from side to side in a given frequency. The torque created by the drive arm 12 is being transmitted onto the drive element 30 by means of the gear drive 14, as the gear wheel section 15 of the drive arm 12 is engaging the gear wheel section 31 of the drive element 30. Due to the transmitted torque to the drive element 30, the drive element 30 is pivotally rotating about a given amount reversibly into clockwise and anti-clockwise direction about pivot axis 36. The torque of drive element 30 is being transmitted by means of the torque transmission element 24 to the two-armed lever 40, left-hand or right-hand longitudinal bars 34a, 34b onto the square cross sectioned sliding block. The received torque is further transmitted via the two armed lever bolt 44 onto the two-armed lever 40 for rotating the two-armed lever 40 about a given amount reversibly into clockwise and anti-clockwise direction. By rotating the two-armed lever 40 two-armed lever adapter 42a is being pushed either upwards or downwards perpendicular to the plait-axis 77. In the same way, but in opposite direction to the up and down movement of two-armed lever adapter 42a, is two-armed lever adapter 42b is being pushed either up or down perpendicular to the plait-axis 77. As the left-hand and the right-hand two-armed lever adapters 42a, 42b are being pushed either upwards and/or downwards perpendicular to the plait axis 77, the upper and lower displacer guide sleeves 74a, 74b are also being pushed either upwards and/or downwards along the displacer guide rod 72 by upper and lower connecting rods 45a, 45b connecting two-armed lever adapter 42a, 42b to upper and lower displacer guide sleeves 74a, 74b. By moving the upper and lower displacer guide sleeves 74a, 74b up and down along the displacer guide rod 72, the upper and lower displacer elements 62a, 62b, 64a, 64b are also being reversibly moved between their opened and closed position, as they are respectively connected to the upper and lower displacer guide sleeves 74a, 74b by means of the upper and lower displacer element supporters 66, 68.

By feeding the relevant information regarding the parameter of the to-be-produced sausage product into the control unit 110, which is connected to the second drive unit 90, the drive shaft (also not shown) of the motor 92 is being turned about a pre-determined amount in respect to the parameter of the to-be-produced sausage product. The drive gear 93 is being turned, as it is connected to the driveshaft of the motor 92. The rotational motion of the drive gear 93 is being transmitted via roller chain 94 onto lead screw gear 95. The rotational motion of the lead screw gear 95 is transmitted onto lead screw 100, causing the lead screw nut 102 to travel either upwards (i.e. away from the adjustment device 20) or downwards (i.e. towards the adjustment device 20) along the lead screw 100. Left-hand and right-hand lead screw guide rods 106a, 106b on each side and parallel to the lead screw are preventing the lead screw nut 102 from rotating around the lead screw 100, as the lead screw nut sleeves 103 are slidably engaging the left-hand and right-hand lead screw guide rods 106a, 106b. Since the lead screw nut adapter 104 is connected to the upper drive rod adapter 105a, the drive rod 108 is pushed in the same direction as the lead screw nut 102. The lower drive rod adapter 105b is turning the locking ring adapter 82, depending on the upwards or downwards direction of the drive rod 108, either clockwise or anti-clockwise direction. The locking ring 80 is transmitting its received torque from the drive rod 108 via centric portion 27 onto the eccentric portion 29 of the bushing 25, causing pivot axis 47 of two-armed lever 40 to be moved along a circle about pivot axis 36 of drive element 30. The amount of the movement of the pivot axis 47 corresponds to the amount of the movement of locking ring 80.

As the pivot axis 47 of two-armed lever 40 is being moved about a predetermined amount, the position of two-armed lever 40 has been changed relative to drive unit shaft 22 and to drive element 30, respectively. Thus, the upper and lower displacer elements 62a, 62b, 64a, 64b are pushed respectively upwards and downwards in the direction perpendicular to the plait axis 77, since they are connected via the upper and lower displacer element supporters 66, 68 and the upper and lower connecting rods 45a, 45b to the left-hand and right-hand two-armed lever adapters 42a, 42b.

Since, the drive element 30 rests slidable on the centric portion 27 of the bushing 29, the pivot axis 36 of drive element 30 is not being moved and stays stationary relative to drive unit shaft 22, as the locking ring 80 is applying a torque onto the eccentric portion 29 of the bushing 25, in order to move the pivot axis 47 of two-armed lever 40.

Also, as the torque transmission element 24 is in form of a square cross sectioned sliding block and being positioned within the notch 35 between the two drive element guide arms 34a, 34b of the drive element guide notch 35, the torque transmission element 24 is able to compensate the relative movement of the drive element 30 to the two-armed lever 40 and allows a reliable transmission of torque between drive element 30 and two-armed lever 40.

By moving the pivot axis 47 of the two-armed lever 40 relative to the pivot axis 36 of drive element 30, caused by adjusting bushing 25, two-armed lever 40 is also pivoted in its position relative to drive element 30. During this adjustment, the closed position as well as the opened position of the upper and lower displacer elements 62a, 62b, 64a, 64b are changed accordingly. The amount of which the two-armed lever 40 is being moved is directly proportional to the amount of which the opened and closed position of the upper and lower displacer elements 62a, 62b, 64a, 64b are being changed. In the case of changing the closed position of the upper and lower displacer elements 62a, 62b, 64a, 64b about a pre-determined amount, the displacer clearance 77 is being changed about an amount relative and in proportion to that amount of the change of the closed position of the upper and lower displacer elements 62a, 62b, 64a, 64b.

In other words, by adjusting the position of the bushing 25, in particular the eccentric portion 29 of bushing 25, an adjustment of the opened and closed position of the displacer elements 62a, 62b, 64a, 64b can be done as well as an adjustment of the diameter of the displacer clearance 77.

Thereby, it is possible to easily adapt the displacer clearance 77 according to the respective parameters of the to-be produced sausage products. The adjustment of the size of the displacer clearance 77 may even be done during the on-going production without having to stop the sausage-product manufacturing process. The displacer clearance 77 can be increased, if, for example, a sausage product with a larger diameter, a thicker tubular packaging casing or a more rigid and dense filling material is to be produced, in order to create an appropriate plait-like portion on a tubular packaging casing in respect to the cross-section area of the plait-like portion and without damaging the sausage product. It is thereby possible to start-up the production process of the sausage products according to the pre-selected production parameters and to change the size of the displacer clearance 77 during the production process, in order to adapt or fine-tune the size of the displacer clearance 77 to the actual or changing production requirements.

LIST OF REFERENCES

1 Apparatus
10 First drive unit
12 Drive arm
13 Free end of drive arm
14 Gear drive
15 Gear wheel section
16 Longitudinal lever
20 Adjustment device
22 Drive unit shaft
24 Torque transmission block
25 Bushing
27 Centric portion of the bushing
29 Eccentric portion of the bushing
30 Drive element
31 Gear wheel section
32 Drive element guide
33 Disc
34a Left-hand drive element guide arm
34b Right-hand drive element guide arm
35 Notch
26 Pivot axis of centric portion 30
37 Centre hole
40 Two-armed lever
41 Centre hole
42a Left-hand two-armed lever adapter
42b Right-hand two-armed lever adapter
43 Panel
44 Two-armed lever bolt
45a Upper connecting rod
45b Lower connecting rod
46 Two-armed lever attachment
47 Pivot axis of eccentric portion 40
48a Left-hand connecting pin
48b Right-hand connecting pin
50a First Displacer unit
50b Second Displacer unit
60a First pair of displacer elements
60b Second pair of displacer elements
62a Upper displacer element of first displacer unit
62b Lower displacer element of first displacer unit
64a Upper displacer element of second displacer unit
64b Lower displacer element of second displacer unit
64 Lower displacer element
66 Upper displacer element supporter
68 Lower displacer element supporter
70 Displacer guide
72 Displacer guide rod
74a Upper displacer guide sleeve
74b Lower displacer guide sleeve
75a Upper displacer guide sleeve adapter
75b Lower displacer guide sleeve adapter
76a Upper displacer guide sleeve adapter pin
76b Lower displacer guide sleeve adapter pin
77 Longitudinal plait-axis
78 Displacer clearance
80 Locking ring
81 Locking ring cover disc
82 Locking ring adapter
84 Locking ring washer
86 Locking ring screw
90 Second drive unit 92 Motor
93 Drive gear of motor
94 Roller chain
95 Lead screw gear
100 Lead screw
101 Centre line of lead screw
102 Lead screw nut
103 Lead screw nut sleeve
104 Lead screw nut adapter
105a Upper drive rod adapter
105b Lower drive rod adapter
106a Left-hand lead screw guide rod
106b Right-hand lead screw guide rod
107 Drive rod shaft
108 Drive rod
109 Drive rod centre line
110 Control unit

The invention claimed is:

1. An apparatus for producing a plait-like portion on a tubular packaging casing which accommodates a filling material, wherein the plait-like portion is at least approximately free of filling material and comprises a longitudinal plait-axis, comprising:
    a first displacer unit with a first pair of displacer elements being reversibly movable perpendicular to the longitudinal plait-axis between an opened and a closed position creating a displacer clearance between the first pair of displacer elements surrounding the longitudinal plait-axis, in which the tubular packaging casing is being gathered, when the first pair of displacer elements is in the closed position,
    a second displacer unit with a second pair of displacer elements being reversibly movable perpendicular to the longitudinal plait-axis between an opened and a closed position creating a displacer clearance between the second pair of displacer elements surrounding the longitudinal plait-axis, in which the tubular packaging casing is being gathered, when the second pair of displacer elements is in the closed position, the second displacer unit being reversibly movable parallel to the longitudinal plait-axis between a narrow position in which the first displacer unit is adjacent to the second displacer unit, and a spread position in which the second displacer unit is moved away from the first displacer unit, and
    a first drive unit for the movement of the first and second pair of displacer elements between the opened and closed position having an adjustment device rotatable around a pivot axis essentially parallel to the longitudinal plait-axis, wherein
the pivot axis of the adjustment device is adjustable for changing the size of the displacer clearance created by the first and second pair of displacer elements,
wherein the adjustment device comprises a drive element and a two-armed lever, which are coupled to each other by a torque transmission element, which is attached to the two-armed lever and extends into a radial aligned guide of the drive element.

2. The apparatus according to claim 1, wherein the adjustment device comprises a bushing with a centric portion and an eccentric portion.

3. The apparatus according to claim 2, wherein the two-armed lever is mounted onto the eccentric portion of the bushing.

4. The apparatus according to claim 2, wherein the adjustment device comprises a locking ring with an eccentric adapter firmly connected onto the bushing.

5. The apparatus according to claim 4, additionally comprising a second drive unit for driving the adjustment device.

6. The apparatus according to claim 5, wherein the second drive unit is a linear actuator.

7. The apparatus according to claim 5, wherein the second drive unit comprises a lead screw with a lead screw nut.

8. The apparatus according to claim 7, wherein the second drive unit comprises a drive rod connecting the lead screw nut with the adjustment device.

9. The apparatus according to claim 5, wherein a control unit is linked to the first and second drive units.

10. The apparatus according to claim 5, wherein a control unit is linked to the first and second drive units.

11. The apparatus according to claim 1, additionally comprising a second drive unit for driving the adjustment device.

12. The apparatus according to claim 11, wherein the second drive unit is a linear actuator.

13. The apparatus according to claim 12, wherein the second drive unit comprises a lead screw with a lead screw nut.

14. The apparatus according to claim 2, additionally comprising a second drive unit for driving the adjustment device.

15. The apparatus according to claim 14, wherein the second drive unit is a linear actuator.

16. The apparatus according to claim 15, wherein the second drive unit comprises a lead screw with a lead screw nut.

17. The apparatus according to claim 3, wherein the adjustment device comprises a locking ring with an eccentric adapter firmly connected onto the bushing.

18. The apparatus according to claim 17, additionally comprising a second drive unit for driving the adjustment device.

19. The apparatus according to claim 18, wherein
    the second drive unit is a linear actuator; or
    the second drive unit comprises a lead screw with a lead screw nut; or
    a control unit is linked to the first and second drive units.

20. The apparatus according to claim 19, wherein the second drive unit comprises
    a lead screw with a lead screw nut; and
    a drive rod connecting the lead screw nut with the adjustment device.

* * * * *